Nov. 2, 1937.  A. RONNING  2,097,703
COMBINATION TRACTOR-ELEVATOR AND POWER TRANSMISSION
Original Filed June 10, 1935  3 Sheets-Sheet 1

INVENTOR.
ADOLPH RONNING
BY
ATTORNEY.

Nov. 2, 1937.  A. RONNING  2,097,703
COMBINATION TRACTOR-ELEVATOR AND POWER TRANSMISSION
Original Filed June 10, 1935  3 Sheets-Sheet 2
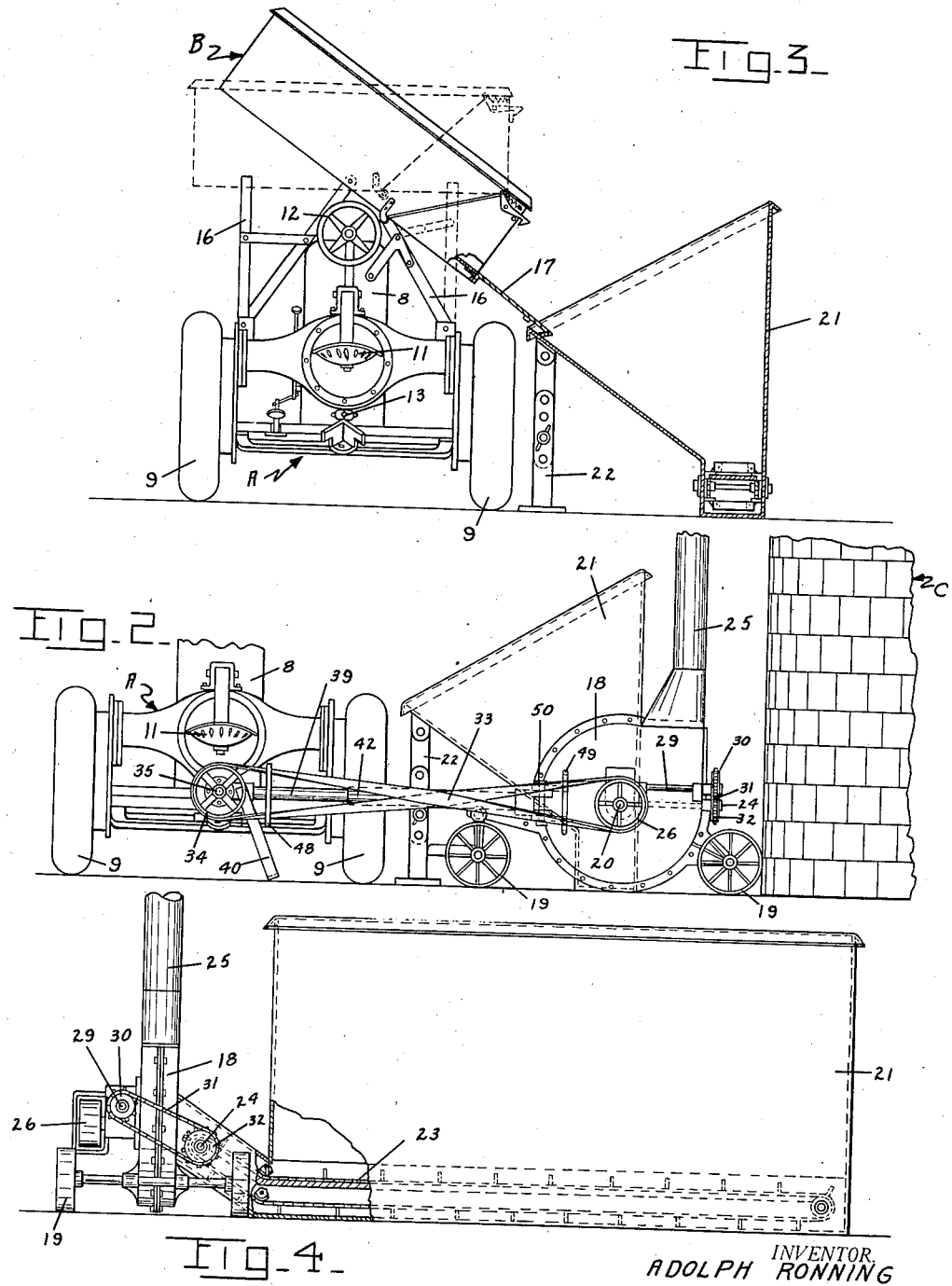
INVENTOR
ADOLPH RONNING
BY
ATTORNEY.

Nov. 2, 1937.  A. RONNING  2,097,703
COMBINATION TRACTOR-ELEVATOR AND POWER TRANSMISSION
Original Filed June 10, 1935  3 Sheets-Sheet 3

INVENTOR.
ADOLPH RONNING
BY
ATTORNEY.

Patented Nov. 2, 1937

2,097,703

UNITED STATES PATENT OFFICE 2,097,703

COMBINATION TRACTOR-ELEVATOR AND POWER TRANSMISSION

Adolph Ronning, Minneapolis, Minn.

Original application June 10, 1935, Serial No. 25,833. Divided and this application April 2, 1936, Serial No. 72,313

7 Claims. (Cl. 214—46)

This invention relates to crop harvesting equipment and the primary object is to provide a novel, efficient, and practical mechanism for receiving crop material and elevating it into a silo or other receptacle. A further object is to provide such a mechanism with a receiving hopper arranged to receive the crop material from a motor propelled vehicle drawn adjacent thereto, and to provide a power transmitting mechanism for quick and easy coupling connection with the power plant of the vehicle for operating the receiving and elevating mechanism while the vehicle is in dumping or discharge position with respect to such hopper. More particularly it is my purpose to arrange the hopper of the elevating mechanism so that a tractor-vehicle may be driven alongside thereof for lateral dumping of its receptacle into the hopper, and to transmit the required elevating power by a device swingable into operative position in the rear of the tractor, when in such unloading position, for connection with the usual, rearwardly extending power take-off shaft of the tractor. These and other more detailed and specific objects will be disclosed in the course of the following specification, reference being had to the accompanying drawings, wherein:

Fig. 2 is an elevation of the machine (as seen from below in Fig. 1) and with the upper portion of the tractor and its receptacle removed.

Fig. 3 is a rear elevation of the tractor and with the receptacle thereof in dumping position with respect to the hopper, and with a portion of the receptacle and the hopper in section, as on the line 3—3 in Fig. 1.

Fig. 4 is an elevation of the elevating unit and its receiving hopper, as seen from the silo side thereof.

Figure 1:
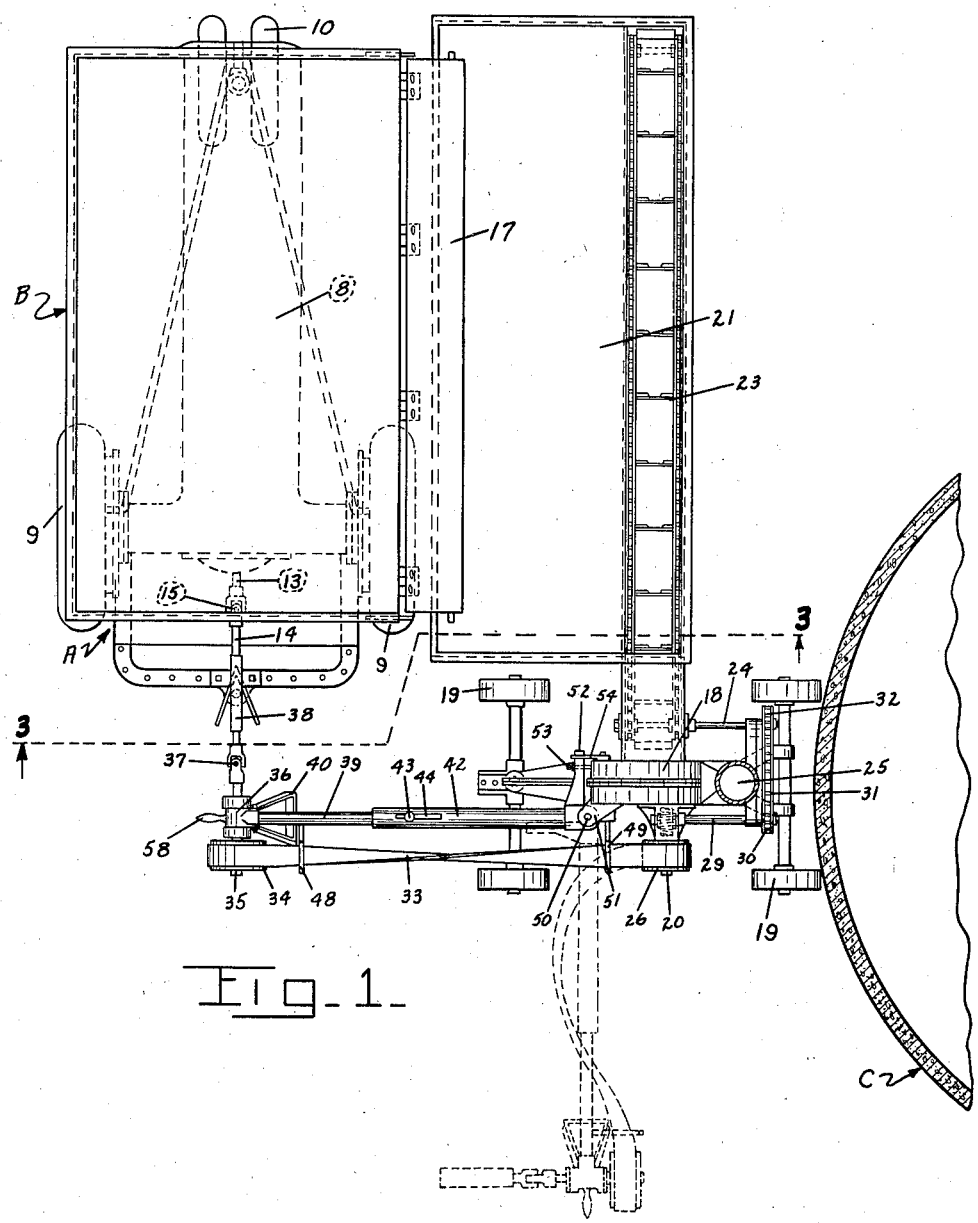
Fig. 1 is a plan view of the machine showing it in delivery position with respect to a silo in receiving position with respect to a tractor vehicle receptacle, and with the power transmitting mechanism coupled to the power take-off shaft of the tractor.

It may here be noted that the present application is a division of my copending parent application Ser. No. 25,833, filed June 10th, 1935, for Crop harvesting apparatus and method; now Patent No. 2,048,141, issued July 21st, 1936.

Referring to the drawings particularly and by reference characters, A designates a tractor of conventional or suitable design having a power plant 8, rear traction wheels 9, front steering truck 10, operators seat 11, and steering wheel 12. The usual power take-off shaft 13 is provided with a squared shank extension 14 connected thereto by universal joint 15, as more particularly set forth in my aforementioned parent application, and also as disclosed in my companion divisional application Serial No. 71,219, for Tractor implement hitch; now Patent No. 2,078,413.

The tractor is provided with a load carrying receptacle B which is mounted thereon by frame work 16 and is supported for lateral tilting movement on a longitudinal axis. One side wall 17 of the receptacle B is hinged at its lower edge for dropping or swinging movement into a lower position, as in Figs. 1 and 3, to serve as a chute for the material being dumped. This arrangement is specifically disclosed and claimed in my copending companion application Serial No. 67,240, for Combination tractor vehicle and dump, which application is also a division of Serial No. 25,833.

The crop receiving and elevating machine is generally of the portable type disclosed in Ronning and Ronning Patent No. 1,490,404, issued April 15th, 1924, for Pneumatic elevator, and includes a fan housing 18 mounted on a truck 19 so that the unit may be transported from place to place. In the present instance it is shown as positioned adjacent the silo C for purpose of illustration, but which might be considered representative of a treating chamber or processing plant. The fan of the centrifugal type is driven by a shaft 20 extending axially thereof and through the housing 18. In one side of the blower there is positioned a large receiving hopper 21 which, as shown, rests upon the ground and has an adjustable lateral support 22 (see Fig. 3) to prevent the hopper from tilting. An endless conveyor 23 operates longitudinally in the bottom of the hopper 21, and at one end of the hopper has an inclined run travelling up over a shaft 24 so that the material dumped into the hopper will be conveyed longitudinally thereof and upwardly into a central opening in the fan housing 18. Within the housing the material is then engaged by the fan which blows it up through an outlet spout 25 for delivery into the silo or processing chamber C.

The fan shaft 20 is rotated by a pulley 26 mounted thereon, and power is conveyed from the shaft 20 to the shaft 24 under reduced speed through a worm 27, a worm gear 28, a shaft 29, sprocket pinion 30, sprocket chain 31, and a sprocket pinion 32, the latter being secured on one end of the shaft 24. The pulley 26 is driven by a belt 33 which also passes over a drive pulley 34 mounted on a shaft 35 which extends through and rotates in a bearing hub 36. The opposite or forward end of the shaft 35 is connected by a universal joint 37 to a coupling socket 38 which is opened at one end to slidably receive the square shank 14 (see Fig. 1) connected by universal joint 15 to the power take-off shaft 13 of the tractor. The bearing hub 36 is secured upon the outer end of a rod or pipe 39, and is additionally supported from the ground by a leg frame 40 which is preferably pivoted to the bearing casting 36 as at 41 so that by slightly inclining the leg frame 39, as indicated in Figs. 1, 2, 5, and 6, slight vertical adjustment of the assembly 34—37 may be made.

The pipe 39 is slidably secured in a sleeve or tube 42, the sliding action being limited by a pin 43 secured in the pipe 39 and operating in slots 44 in the sleeve 42. The pipe 39 is normally held in a projected position by a compression spring 45 disposed within the sleeve 42 and acting upon the inner end of the pipe 39. The opposite end of the spring stops against a pin 46 selectively insertable in various perforations 47 (Fig. 5), whereby the tension of the spring may be regulated. It may here be noted that the pipe 39 carries a frame 48 at its outer end and adjacent the pulley 34 through which the belt 33 passes and is guided. A similar frame 49 is secured to the fan housing 18 to receive and guide the rear portion of the belt adjacent the pulley 26. The rear end of the sleeve 42 is pivotally secured as at 50 between a pair of lugs 51 extending integrally out from the housing 18; and adjacent the pivot bolt 50 the member 42 is provided with a laterally extending arm 52 which is provided with an adjustable set screw 53 for stopping engagement with a portion of the fan housing 18. The arm 52 is also engageable with an angularly formed latch 54 which is pivoted to the casing 18 as at 55, and has a depending arm portion which is connected by a wire or cable 56 to a finger lever 57 that is fulcrumed to the bearing hub 36 immediately adjacent to a handle 58 which is fixed in the hub.

The purpose of the foregoing construction is to provide means for quickly and easily connecting and disconnecting the elevator unit with respect to the power take-off shaft of the tractor after the tractor has been moved into dumping position with respect to the elevator hopper 21. Thus in order to permit the tractor to be driven forwardly into load dumping position, the operator grasps the handle 58 and releases the latch hook 54 by a pulling on the hand lever 57. By slightly lifting on the handle 58 the telescopic beam 39—42 can then be swung on the pivot 50 to one side, as indicated by the dotted lines in Fig. 1, to permit the tractor to be driven into place. Meanwhile the guide frames 48 and 49 serve to prevent disengagement of the belt 33 from the pulleys 34 and 26.

Figure 5:
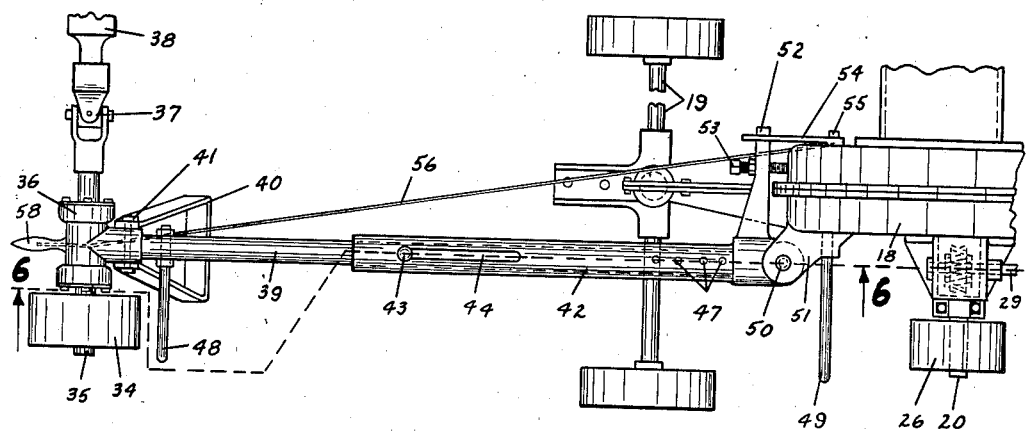
Fig. 5 is an enlarged detail plan view of the tractor-elevator power connection with the transmission belt omitted.
Figure 6:
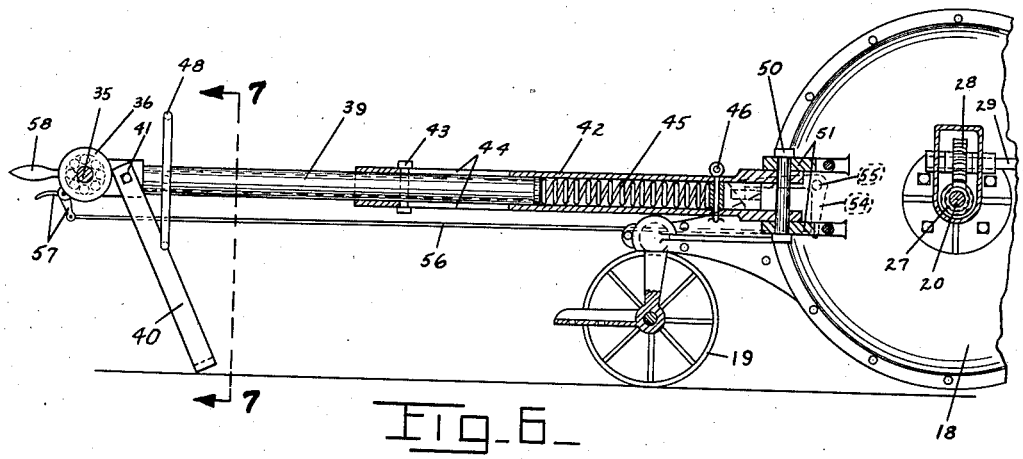
Fig. 6 is a sectional elevation on the irregular line 6—6 in Fig. 5.
Figure 7:
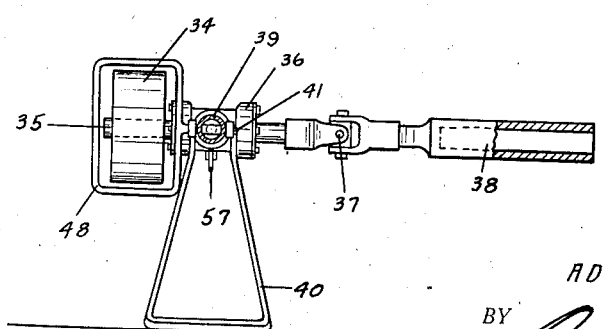
Fig. 7 is a sectional elevation on line 7—7 in Fig. 6.

To establish the power connection between the tractor and the elevator, after the tractor has been driven into dumping position, the operator again grasps the handle 58 and restores the telescopic beam 39—42 to the full line position shown in Figs. 1 and 5, and while doing so inserts the shank 14 into the open end of the coupler 38 so that rotation of the power take-off shaft 13 will be transmitted through the parts 15, 14, 38, and 37 to the pulley shaft 35, it being understood that the universal joints 15 and 37 will allow for a considerable freedom of movement when making the connection, and also compensates for differences in ground level upon which the tractor and elevator units may be standing.

When restoring the power transmitting units to their normal operative positions the operator also partially compresses the spring 45 so as to establish the necessary tautness in the belt 33, thus eliminating the necessity of any additional belt tightener; and as the beam 39—42 is swung into place it engages under the latch 54 which thus secures the beam in place and prevents any lateral displacement thereof either accidentally or through the action of the spring 45.

After the load has been dumped and the elevator unit has done its work in elevating the same, the operator needs only to lift one side of the receptacle B to restore it to its normal position, and also of course closes the side wall 17. To disconnect the tractor from the elevator it is only necessary to drive away, at which time the shank 14 will pull out of the coupling socket 38, leaving the latter connected to the universal joint 37 until the next power connection with the elevator unit is to be made.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. The combination including a material handling apparatus having a stationary hopper to receive material dumped laterally thereinto from the receptacle of a motor driven vehicle when the vehicle is driven into discharging position adjacent one side of the hopper, a power transmission device extending from the material handling apparatus and for attachment to a power take-off shaft at the rear of the vehicle, when the latter is in said discharging position, said transmission device being connected to the material handling apparatus by a flexible means permitting the transmission device to be swung entirely clear of the path of travel of the vehicle and then returned to coupling position with respect to the power take-off shaft of the vehicle after the same has been driven forwardly into said discharging position.

2. A material elevating apparatus comprising a stationary hopper adapted to receive material discharged thereinto from the receptacle of a power vehicle driven to a position laterally adjacent thereto, an elevating device, means for conveying material from the hopper into said elevating device, and power transmission means, having a coupling for detachable connection with a power take-off shaft extending rearwardly from the power vehicle, for operating the elevating device and conveying means, said transmission means being swingable with respect to the elevating apparatus proper and to a position entirely clear of the vehicle as the latter is driven into unloading position at the side of the hopper.

3. A material handling apparatus for use with a motor vehicle having a dump receptacle thereon and having a power take-off shaft at its rear for transmitting power from the motor, comprising an elevating mechanism supported independently of the vehicle and having a stationary hopper for receiving material dumped thereinto from the vehicle receptacle, means for conveying material received in the hopper, and means, including a coupling member connectable with the power take-off shaft at the rear of the vehicle, for operating the conveying means, said operating means being jointed whereby the coupling member portion thereof may be moved out of the path of vehicle travel while the vehicle is being driven into unloading position.

4. A machine of the character described comprising a frame, material conveying means carried by the frame, a pulley carried by the frame and for operating the conveying means, an arm extending from the frame, a second pulley supported by the arm and connected by a belt to the first pulley, said arm being extensible under spring action to thereby yieldably spread the pulleys with respect to each other to maintain belt tension.

5. A mechanism for transmitting power from the power take-off shaft of a motor driven vehicle to a stationary apparatus adjacent to which the vehicle has been driven, comprising an apparatus frame having an element to be rotated, a coupler for detachable connection to said power take-off shaft, means for transmitting power from the coupler to said element, and means supporting the coupler and connecting it to the apparatus frame, said means having freedom for movement with respect to the apparatus frame to permit the coupler to be swung into and out of the vehicle path and into alignment with the power take-off shaft of the vehicle.

6. A mechanism for transmitting power from the power take-off shaft of a motor driven vehicle to a stationary apparatus adjacent to which the vehicle has been driven, comprising an apparatus frame having an element to be rotated, a coupler for detachable connection to said power take-off shaft, means for transmitting power from the coupler to said element, an arm extending from the frame to support said coupler at its outer end, and with its inner end pivoted to the frame to permit the arm and coupler to be moved outside of the path of travel of the vehicle.

7. A mechanism for transmitting power from the power take-off shaft of a motor driven vehicle to a stationary apparatus adjacent to which the vehicle has been driven, comprising an apparatus frame having an element to be rotated, a coupler for detachable connection to said power take-off shaft, means for transmitting power from the coupler to said element, an arm extending from the frame to support said coupler at its outer end, and with its inner end pivoted to the frame to permit the arm and coupler to be moved outside of the path of travel of the vehicle, said arm being longitudinally adjustable to facilitate aligning and application of the coupler with respect to such power take-off shaft.

ADOLPH RONNING.